(12) United States Patent
Haid et al.

(10) Patent No.: US 6,592,167 B2
(45) Date of Patent: Jul. 15, 2003

(54) SCREENING ARRANGEMENT FOR A REAR WINDOW OF A MOTOR VEHICLE

(75) Inventors: Jürgen J. Haid, Remseck (DE); Horst Holzhauer, Neuhausen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/768,509

(22) Filed: Jan. 25, 2001

(65) Prior Publication Data

US 2001/0023747 A1 Sep. 27, 2001

(30) Foreign Application Priority Data

Jan. 25, 2000 (DE) .......................................... 100 02 949

(51) Int. Cl.$^7$ .................................................. B60J 3/00
(52) U.S. Cl. ..................... 296/97.9; 296/138; 296/97.1; 160/370.21
(58) Field of Search ............................... 296/97.1, 97.5, 296/97.7, 97.8, 97.9, 138; 160/370.21, 327

(56) References Cited

U.S. PATENT DOCUMENTS

| | | | | |
|---|---|---|---|---|
| 1,457,649 A | * | 6/1923 | Boudhard ................. 160/368.1 |
| 2,234,804 A | * | 3/1941 | Murray ............... 160/370.21 X |
| 4,647,102 A | * | 3/1987 | Ebrahimzadeh ........ 296/97.8 X |
| 4,801,170 A | * | 1/1989 | Moore ...................... 296/97.5 |
| 4,869,542 A | * | 9/1989 | Lin .............................. 296/97.8 |
| 5,042,866 A | * | 8/1991 | Cody .................... 296/97.8 X |
| 5,575,524 A | * | 11/1996 | Cronk ................... 296/97.8 X |
| 5,653,277 A | * | 8/1997 | Kerner et al. .......... 296/97.8 X |
| 5,884,731 A | * | 3/1999 | Young .................... 296/97.8 X |
| 6,296,041 B1 | * | 10/2001 | Cicero ........................ 160/327 |
| 6,322,032 B1 | * | 11/2001 | Su ......................... 296/97.7 X |

FOREIGN PATENT DOCUMENTS

| DE | 1 605 979 | 5/1971 |
|---|---|---|
| DE | 85 17 313 | 10/1985 |

* cited by examiner

Primary Examiner—D. Glenn Dayoan
Assistant Examiner—Patricia L. Engle
(74) Attorney, Agent, or Firm—Crowell & Moring LLP

(57) ABSTRACT

A screening arrangement for a rear window of a motor vehicle has a screening element held by a clamping device. The clamping device has clamping rods which are arranged at least at sides of the screening element and are respectively held at a retaining bearing on a lining of a roof and at a counterbearing on a lining bordering on the lower edge of the rear window.

23 Claims, 1 Drawing Sheet

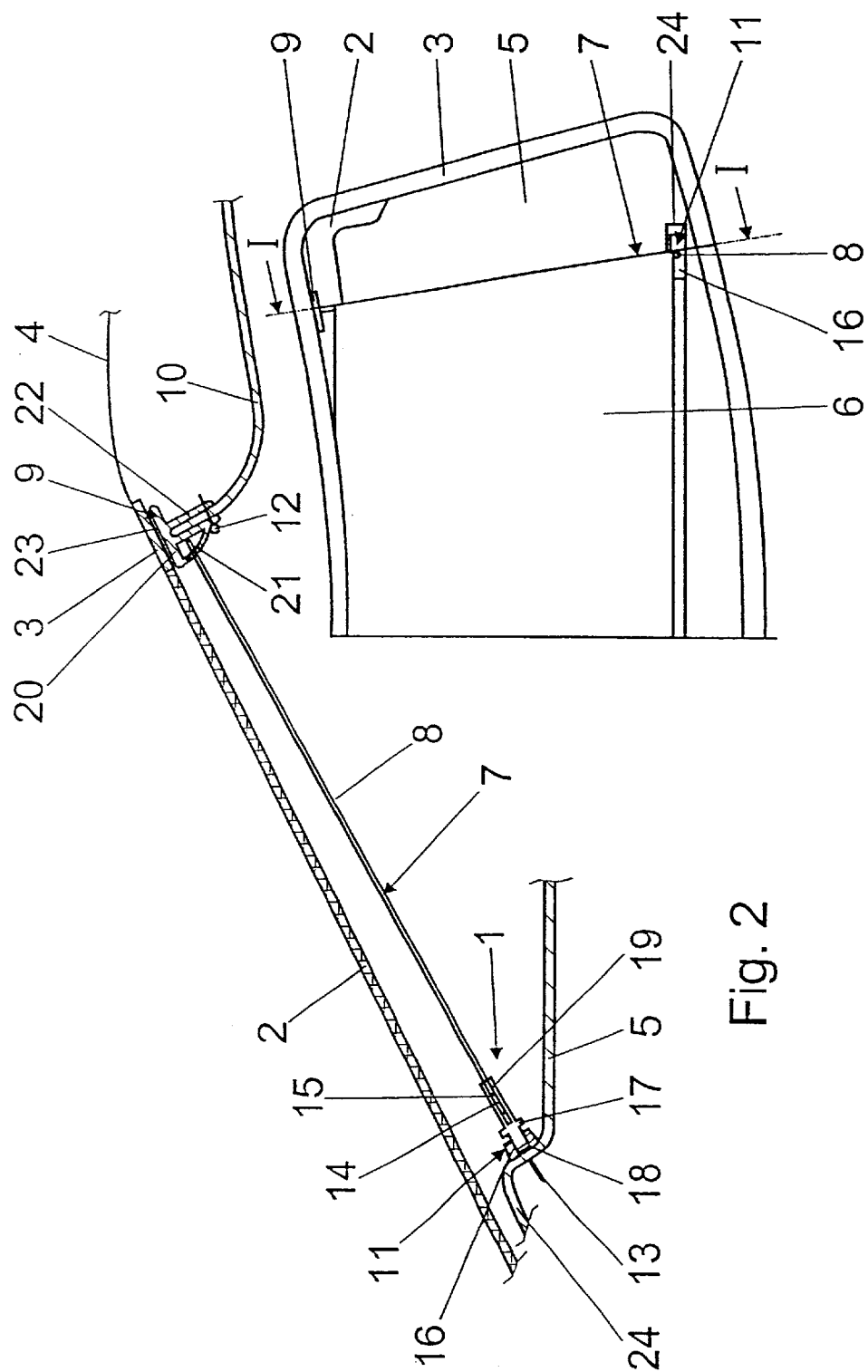

SCREENING ARRANGEMENT FOR A REAR WINDOW OF A MOTOR VEHICLE

BACKGROUND AND SUMMARY OF INVENTION

This application claims the priority of German Patent Document 100 02 949.3, filed in Germany, Jan. 25, 2000, the disclosure of which is expressly incorporated by reference herein.

The invention relates to a screening arrangement for a rear window of a motor vehicle, having a screening element held by a clamping device.

Static sun protection devices for vehicle rear windows are known in practice, such devices generally consisting of a spring wire frame covered by coarse knitted fabric, and being fastened to the glazing by means of suction cups.

Although sun protection devices of this type are very cost-effective there is a considerable disadvantage in the undefined fastening of the suction elements whose adhesiveness requires a clean adhesive surface.

Furthermore, with sun protection devices of this type the all-purpose design means that the shaded area is generally insufficient, since relatively large regions of the rear window are not screened. The vehicle interior, in particular the rear region, is therefore not only exposed to the sun's rays, but also to unwanted looking-in, which is disadvantageous particularly when the sun protection devices are used as a visual screen for the rear compartment.

In addition, the fastening of the sun protection device by means of suction cups has an adverse effect on the visual appearance of the vehicle, particularly if the vehicle concerned is a relatively expensive saloon.

German Patent Document No. DE 85 17 313 U1 discloses, as a screening arrangement for a rear window, a curtain which is held by curtain rails and is guided displaceably by means of hooks along a curtain rail fastened to the upper edge of the rear window and along a curtain rail fastened to the lower window edge. In this case, the curtain rails are pushed by means of clips between a window seal and a glass pane of the rear window and are therefore fixed in the window frame.

A curtain of this type, which is comparatively complicated and cost-intensive, requires time-intensive installation and so its placement is generally permanent.

German Patent No. DE 1 605 979 describes an antidazzle filter for use in front and rear windows of motor vehicles, in which a filter plate made of antidazzle material essentially has the outline shape of the inner contour of the window frame supporting the window pane, tabs being provided on the circumferential edge and being brought into engagement with the window frame in order to fasten the filter plate.

Although this solution appears simple, rear windows of motor vehicles are generally of a size which makes the uniform arrangement and fixing of the filter plate acting as an antidazzle element considerably more difficult. Considerable tolerances can therefore be expected during installation, but it is not possible to compensate for these tolerances using the known solution.

An object of the present invention is to provide a screening arrangement for a rear window of a motor vehicle, which arrangement enables extensive screening of the rear window from light shining and people looking into the vehicle interior, and which permits rapid installation and removal while being held securely when operational.

According to the invention, this object is achieved by a screening arrangement for a rear window of a motor vehicle, having a screening element held by a clamping device having clamping rods which are arranged at least at sides of the screening element and are respectively held at a retaining bearing on a lining of a roof and at a counterbearing on a lining bordering on a lower edge of the rear window.

With the screening arrangement according to the invention, when the dimensions of the screening element are matched to the vehicle, complete screening of the rear compartment from the sun shining in and people looking in from outside through the rear window can be realized. In this case, the fastening of the screening element via clamping rods between the lining parts of the roof lining and the lining on the lower edge of the glass pane, for example on the rear parcel shelf, is particularly advantageous, since this type of fastening enables rapid installation and removal of the screening element. The latter can therefore be rapidly attached to the rear window when the need arises, while it can be rapidly removed when not required, if vehicle occupants so desire. Moreover, the type of fastening is secure in a crash.

A further advantage of the screening arrangement according to the invention resides in its placement in a vehicle irrespective of tolerances, since tolerances in the transverse direction of the vehicle can be compensated for by suitable positioning of the bearings for the clamping rods, while compensation for tolerances perpendicularly thereto, i.e. between the lower window edge and rooflining, can be obtained via changes in length of the clamping rods.

Moreover, the screening arrangement is of very good value in production, but on the other hand looks as though it costs a lot.

In a particularly advantageous design of the invention, provision may be made for the retaining bearing and/or the counterbearing to be fixed on the associated lining by needle-like fastening elements. This enables the holding elements or bearings for the clamping rods to be removed during refitting without lasting damage to the lining parts, as inevitably arises in the case of drilled holes, for example.

Other objects, advantages and novel features of the present invention will become apparent from the following detailed description of the invention when considered in conjunction with the accompanying drawings.

BRIEF DESCRIPTION OF THE DRAWINGS

FIG. 1 shows a schematic plan view of a screening arrangement according to the invention on a rear window; and FIG. 2 shows a cross section through the screening arrangement according to the invention along the line I—I from FIG. 1.

DETAILED DESCRIPTION OF THE DRAWINGS

With reference to FIG. 1 and FIG. 2, a screening arrangement 1 for a rear window 2 of a passenger car, constituting a saloon or limousine in the present case, is shown in simplified form. The rear window 2 has, in a known manner, a window frame 3 with which it borders on a roof 4 at its upper end and on a rear step of the vehicle at its lower edge. In the vehicle interior, a lining 5, which is usually referred to as the rear parcel shelf, borders on the lower edge of the rear window 2.

In order to screen the rear window 2 from sun, light and heat rays and also as viewing protection, the screening arrangement 1 has a screening element 6. This screening element 6, which is designed as a woven plastic fabric in the present case, is held when fitted by a clamping device 7 having a clamping rod 8 in each case at the sides of the screening element 6. The clamping rod 8 is held in each case at a retaining bearing 9 on a lining 10 of the roof, which is conventionally also referred to as the roof lining, and at a counter bearing 11 on the rear parcel shelf 5.

Both the retaining bearing 9 and the counter bearing 11 are in each case fixed on the lining parts assigned to them by two needle-like, thin and pointed fastening elements 12 and 13, respectively, with which the lining 10 of the roof lining and the lining 5 of the rear parcel shelf are pierced. In this case, the piercing of the lining 10 of the rooflining and of the lining 5 of the rear parcel shelf is so small that no through-holes visible as conspicuous damage remain during refitting.

In order to fasten the screening element 6 in the retaining bearings 9 and counter bearings 11, at one of their ends the clamping rods 8, which are connected to the knitted fabric, have a thread 14 which combines with a thread 15 on the counterbearing 11. For this purpose, the counterbearing 11 has a retaining element or a retaining block 16 and a clamping sleeve 17 which is inserted, by a plug-in connection, into a recess or hole 18 matching the external radius of the clamping sleeve 17, in the retaining block 16.

Rotation of the clamping rod 8 in the thread 15 formed in a hole 19 in the clamping sleeve 17 causes the clamping rod 8 to move towards the retaining bearing 9 on the rooflining 10 where a plug-in device 20 is provided for retaining the clamping rod 8. The plug-in device 20 of the retaining bearing 9 is formed with a hole 21, into which the clamping rod 8 is inserted, and has a U-shaped hook 22 or a clip by means of which it is plugged onto the edge of the lining 10. The lining 10 is conventionally manufactured from elastic material, and can therefore be correspondingly bent downwards. In order to prevent noises, and at the same time as protection against twisting in the event of relatively high forces in the transverse direction of the vehicle, padding 23 in the form of a felt insert is provided between the retaining bearing 9 and the rear window 2 or its window frame 3.

A fastening of this type enables, via the clamping rod 8, a tolerance between the lining 5 of the rear parcel shelf, which in the present case, as in numerous types of vehicle, has a slope 24 in the bearing region of the disc-like retaining element or retaining block 16 of the counterbearing 11, and the lining 10 of the rooflining to be compensated for.

Tolerances in the transverse direction of the vehicle are compensated for via suitable positioning of the retaining bearing 9 and counterbearing 11 and via the knitted fabric of the screening element 6, which encloses the respective clamping rod 8 by means of a seam formed by high-frequency welding.

As an alterative to the design which is shown, provision may also be made for the screening element 6 to have a film in place of a knitted fabric, the film being connected in a suitable manner to the clamping rods 8.

Furthermore, provision may also be made in other designs for the clamping rods to have a thread at both of their ends in order to be more universal during installation. It is also contemplated for the clamping rod to be screwed onto the rooflining and to be plugged into the rear parcel shelf, even though the screwing into the counterbearing 11 assigned to the rear parcel shelf appears more simple for an operator, since in this case less "overhead" work has to be carried out during installation.

Furthermore, the installation of retaining bearings and counterbearings on the assigned lining parts can, also be varied in further designs.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. A motor vehicle screening arrangement for a rear window of the motor vehicle, having a screening element held by a clamping device having a pair of clamping rods which each extend along respective sides of the screening element and wherein each clamping rod is held at respective retaining bearings pierced through a roof lining and at respective counterbearings pierced through a rear parcel shelf lining bordering on a lower edge of the rear window.

2. Motor vehicle screening arrangement according to claim 1, wherein at least one of the retaining bearing and the counterbearing is fixed on the associated lining by at least one needle-like fastening element.

3. Motor vehicle screening arrangement according to claim 1, wherein the clamping rods have a threaded part, on at least one of their ends, wherein the threaded part is engageable with a threaded part on the one of the retaining bearing and the counterbearing.

4. Motor vehicle screening arrangement according to claim 3, wherein, in the clamping position, the threaded part of the clamping rods is engageable with a clamping sleeve of one of the retaining bearing and counterbearing, in which the threaded part of the one of the retaining bearing and the counterbearing is formed in a hole receiving the respective clamping rod.

5. Motor vehicle screening arrangement according to claim 4, wherein, in the clamping position, the clamping sleeve is pressed by its end facing away from the clamping rod into a recess matching the shape of the clamping sleeve, said recess being disposed in a retaining element which is arranged on the lining assigned to one of the retaining bearing and the counterbearing.

6. Motor vehicle screening arrangement according to claim 3, wherein an end of a respective clamping rod which is opposite a clamping sleeve is plugged into a plug-in device which, in the clamping position, fits around an edge of the lining assigned to it.

7. Motor vehicle screening arrangement according to claim 6, wherein the plug-in device is fixed on the lining assigned to it in the clamping position by a needle-like fastening element.

8. Motor vehicle screening arrangement according to claim 6, wherein the clamping sleeve is assigned to the counterbearing.

9. Motor vehicle screening arrangement according to claim 1, wherein the clamping rods are each surrounded by a seam of the screening element.

10. Motor vehicle screening arrangement according to claim 1, wherein the screening element constitutes a knitted fabric.

11. A passenger motor vehicle assembly comprising:
a roof with an interior roof lining,
a rear window with a rear parcel shelf lining extending along a lower edge of the rear window, said rear window being disposed adjacent and below the roof lining, and
a screening arrangement for screening the rear window, said screening arrangement including:
(i) a screening device,
(ii) a pair of clamping rods disposed in use at lateral sides of the screening device, (iii) retaining bearings pierced through the roof lining, and (iv) counterbearings pierced through the rear parcel shelf lining, wherein the clamping rods are respectively held at the respective retaining bearings and counterbearings.

12. Assembly according claim 11, wherein at least one of the retaining bearing and the counterbearing is fixed on the associated lining by at least one needle-like fastening element.

13. Assembly according to claim 11, wherein the clamping rods have a threaded part, on at least one of their ends, wherein the threaded part is operable with a threaded part on the one of the retaining bearing and the counterbearing.

14. Assembly according to claim 13, wherein, in the clamping position, the threaded part of the clamping rods is engageable with a clamping sleeve of one of the retaining bearing and counterbearing, in which the threaded part of the one of the retaining bearing and the counterbearing is formed in a hole receiving the respective clamping rod.

15. A motor vehicle screening arrangement for a rear window of the motor vehicle, having a screening element held by a clamping device having clamping rods which are arranged at least at sides of the screening element and are respectively held at a retaining bearing pierced through a roof lining and at a counterbearing pierced through a rear parcel shelf lining bordering on a lower edge of the rear window wherein the clamping rods have a threaded part, on at least one of their ends, wherein the threaded part is engageable with a threaded part on the one of the retaining bearing and the counterbearing.

16. Motor vehicle screening arrangement according to claim 15, wherein at least one of the retaining bearing and the counterbearing is fixed on the associated lining by at least one needle-like fastening element.

17. Motor vehicle screening arrangement according to claim 15, wherein, in the clamping position, the threaded part of the clamping rods is engageable with a clamping sleeve of one of the retaining bearing and counterbearing, in which the threaded part of the one of the retaining bearing and the counterbearing is formed in a hole receiving the respective clamping rod.

18. Motor vehicle screening arrangement according to claim 17, wherein, in the clamping position, the clamping sleeve is pressed by its end facing away from the clamping rod into a recess matching the shape of the clamping sleeve, said recess being disposed in a retaining element which is arranged on the lining assigned to one of the retaining bearing and the counterbearing.

19. Motor vehicle screening arrangement according to claim 15, wherein an end of a respective clamping rod which is opposite a clamping sleeve is plugged into a plug-in device which, in the clamping position, fits around an edge of the lining assigned to it.

20. Motor vehicle screening arrangement according to claim 19, wherein the plug-in device is fixed on the lining assigned to it in the clamping position by a needle-like fastening element.

21. Motor vehicle screening arrangement according to claim 19, wherein the clamping sleeve is assigned to the counterbearing.

22. Motor vehicle screening arrangement according to claim 15, wherein the clamping rods are each surrounded by a seam of the screening element.

23. Motor vehicle screening arrangement according to claim 15, wherein the screening element constitutes a knitted fabric.

* * * * *